(12) United States Patent
Wakabayashi

(10) Patent No.: US 7,792,176 B2
(45) Date of Patent: Sep. 7, 2010

(54) NARROW-BAND LASER DEVICE FOR EXPOSURE APPARATUS

(75) Inventor: Osamu Wakabayashi, Kanagawa (JP)

(73) Assignees: Komatsu Ltd., Tokyo (JP); Ushio Denki Kabushiki Kaisha, Tokyo (JP)

( * ) Notice: Subject to any disclaimer, the term of this patent is extended or adjusted under 35 U.S.C. 154(b) by 24 days.

(21) Appl. No.: 11/985,840

(22) Filed: Nov. 16, 2007

(65) Prior Publication Data

US 2008/0117948 A1    May 22, 2008

(30) Foreign Application Priority Data

Nov. 17, 2006  (JP)  .............................. 2006-311400

(51) Int. Cl.
H01S 3/22 (2006.01)
H01S 3/223 (2006.01)

(52) U.S. Cl. .......................................... 372/57; 372/94

(58) Field of Classification Search ................... 372/57, 372/94
See application file for complete search history.

(56) References Cited

U.S. PATENT DOCUMENTS 5,638,396 A * 6/1997 Klimek ........................ 372/92
6,580,052 B1 * 6/2003 Bartelt-Berger et al. ..................... 219/121.64

2002/0085606 A1 * 7/2002 Ness et al. ..................... 372/55
2006/0007978 A1 * 1/2006 Govorkov et al. ............. 372/55

FOREIGN PATENT DOCUMENTS

JP   2006-049839    2/2006
WO   WO03/096497   11/2003

OTHER PUBLICATIONS

Laser Process Techniques Handbook, Asakura Shoten Corp, 1992.

* cited by examiner

*Primary Examiner*—Minsun Harvey
*Assistant Examiner*—Patrick Stafford
(74) *Attorney, Agent, or Firm*—Husch Blackwell Sanders LLP Welsh & Katz

(57) ABSTRACT

A narrow-band laser device for exposure apparatus that allows to reduce damage to, and to hence extend the life of, optical elements such as chamber windows, output coupling mirrors or the like. A ring resonator is provided in an amplification stage laser of the narrow-band laser device for exposure apparatus that comprises an oscillation stage laser and an amplification stage laser. An OC, a high reflection mirror and a high reflection mirror are arranged to be offset, for instance, relative to a longitudinal direction axis of discharge electrodes. As a result, the beam width of laser light injected through the OC of the amplification stage laser becomes wider as the beam shifts inside the ring resonator, in each round trip within the ring resonator. The energy density of laser light in the optical elements of the amplification stage laser becomes reduced thereby, thus prolonging the life of the optical elements.

5 Claims, 11 Drawing Sheets

NARROW-BAND LASER DEVICE FOR EXPOSURE APPARATUS

BACKGROUND OF THE INVENTION

1. Field of the Invention

The present invention relates to an injection-locked discharge excited laser device for exposure apparatus, comprising a narrow-band laser oscillation stage laser and an amplification stage laser, and more particularly to a laser device for exposure apparatus that allows to extend the life of optical elements such as chamber windows, output coupling mirrors (OC) and the like.

2. Description of the Related Art

Excimer lasers are being used in recent years as light sources for semiconductor exposure devices. In particular, ArF laser light sources having high outputs (40 W or more) and ultra-narrow bands (0.2 pm or less) are being used in the technology node (not more than 45-nm).

With a view to securing high dose stability and achieving higher throughputs, yet higher outputs, of 90 W or more, are being required of ArF laser light sources in light sources for exposure devices.

To meet the above demands as light sources, double-chamber (two-stage) ArF lasers are being used in practice. Broadly, a double chamber laser device can be embodied as a MOPA (Master Oscillator Power Amplifier) device, in which there is provided no resonator mirror at the amplification stage, or as a MOPO (Master Oscillator Power Oscillator) device, in which there is provided a resonator mirror.

To achieve high outputs such as 90 W, the load on the chamber window of the amplifier (PA) or, the optical elements (in particular, chamber windows and OC) of the amplification stage laser (PO), increases, which is problematic in terms of the life of these optical elements. It has become therefore necessary to prolong the life of laser light sources.

Japanese Translation of PCT Application No. 2005-524998 and Japanese Unexamined Patent Application Laid-open No. 2006-049839, for instance, disclose the following technologies for extending the life of an optical element.

Japanese Translation of PCT Application No. 2005-524998 discloses, as illustrated in FIG. 8, a MOPA laser device having an oscillation stage laser (MO) 100 and an amplifier (PA) 200, with a prism beam expander 201 arranged between a discharge electrode of the amplifier (PA) 200 and a laser chamber window of the amplifier (PA) 200. Such a configuration reduces the load (energy density) in the laser chamber window of the amplifier (PA) 200.

Japanese Unexamined Patent Application Laid-open No. 2006-049839 describes a MOPO laser device having an oscillation stage laser (MO) 100 and an amplification stage laser (PO) 300, wherein a beam expander 302 is arranged between a laser chamber 301 and an output coupling mirror (OC) 303 of the amplification stage laser (PO) 300, as illustrated in FIG. 9. Such a configuration reduces the load (energy density) in the output coupling mirror (OC) 303.

When in the above MOPO laser device a ring resonator having high seed injection efficiency is used in the amplification stage laser (PO), the OC and the windows of the chamber of the amplification stage laser (PO) are subjected to a high load, at a final output of 90 W (15 mJ, 6 kHz), which shortens the life of these elements. FIGS. 10A and 10B illustrate a conventional example of a MOPO-type laser device having a ring resonator arranged in the amplification stage laser (PO). FIG. 10A is a side-view of the amplification stage laser (PO) 20, while FIG. 10B is a top-side view of the same.

In the figure, a laser beam emitted by an oscillation stage laser (MO) 10 functions as a seed laser beam, while the amplification stage laser (PO) 20 has a function of amplifying that seed laser light. The oscillation stage laser (MO) 10 and the amplification stage laser (PO) 20 have each respective laser chambers 11, 21, the interior whereof is filled with a laser gas. Inside each laser chamber there is arranged a pair of opposing electrodes 1a, 2a separated by a predetermined distance, such that discharge is effected through application of high-voltage pulses to these pairs of electrodes 1a, 2a.

In the chambers 11, 21 of the oscillation stage laser 10 and the amplification stage laser 20 there are arranged, respectively, window members 12a, 12b, 22a, 22b manufactured using a material having transmissivity towards laser oscillation light.

The oscillation stage laser 10 has a line-narrowing module (LNM) 3 that comprises an expanding prism 3a and a grating (diffraction grating) 3b, such that the optical elements in the line-narrowing module 3 and an OC 14 constitute a laser resonator.

MO laser light (seed laser beam) from the oscillation stage laser 10 is guided via high reflection mirrors 4a, 4b, 4c and is injected into the amplification stage laser (PO) 20.

As illustrated in FIG. 10B, the amplification stage laser (PO) 20 has provided therein a ring resonator comprising an OC 24, which is a partial reflection (PR) mirror having an antireflective (AR) film on the light-incidence side, and high reflection mirrors 5a, 5b, 5c.

A beam outputted from the oscillation stage laser (MO) 10 is injected by the high reflection mirrors 4a, 4b, 4c into the OC 24 of the ring resonator of the amplification stage laser (PO) 20. A high reflection mirror 5a causes the beam to pass through a discharge-free space in a laser chamber 21, and high reflection mirrors 5b and 5c bend the beam into a discharge electrode space. Discharge is carried out through application of voltage between the discharge electrodes 2a, synchronizing with the seed light. The seed light passing through the discharge space is thus amplified, then part of the amplified light passes through the OC 24 and is outputted as a laser, while light reflected by the OC 24 resonates through feedback once more in the ring resonator. Output is effected thus in the form of laser pulses. When the reflectance of the OC 24 is, for instance, of 20 to 30%, some 70 to 80% of the beam outputted from the MO becomes injected into the ring resonator, which allows achieving high injection efficiency. In the case of a MOPA laser device, there is no light resonator in the amplification stage and no resonation-amplification is carried out, so that the device functions merely as an amplifier. As a result, the MO output must be about 10 times that of a MOPO laser device comprising a ring resonator.

When using a ring resonator in the amplification stage laser (PO) 20, however, the load inside the ring resonator increases extraordinarily when the output of the laser is high (90 W or more). In particular, the partial reflection (PR) film that coats the OC 24 of the amplification stage laser (PO) 20 was damaged, which shortened the life thereof. The life of the output-side window 22a of the amplification stage laser (PO) 20 was also shortened on account of high energy density.

Thus, as described in Japanese Translation of PCT Application No. 2005-524998, an optical element for beam expansion may conceivably be arranged on the optical path of a ring resonator provided before the optical element susceptible of deterioration. FIG. 11 illustrates an example of the amplification stage laser (PO) 20 having such a configuration.

In FIG. 11, specifically, a beam expander 7, which is an optical element for beam expansion, is arranged on the optical path of the ring resonator before the output-side window 22a.

When a beam-expanding optical element is arranged in the optical path of the ring resonator, as illustrated in FIG. 11, the ring resonator becomes an unstable-type resonator (a resonator in which a beam is expanded each time it makes a round trip through the resonator). This gives rise to the following problems.

Large oscillation losses in the amplification stage laser (PO) and impaired injection efficiency.

Higher spatial coherence of the output laser light, resulting in generating speckle pattern on the mask of an exposure device.

SUMMARY OF THE INVENTION

In order to solve the above problems, it is an object of the present invention to provide a narrow-band laser device for exposure apparatus, being a laser device for exposure apparatus, comprising a narrow-band oscillation stage laser and an amplification stage laser that uses no optical element for beam expansion and that allows reducing damage to optical elements such as a chamber window, an output coupling mirror (OC) or the like, extending thus the life thereof.

In order to solve the above problem, a laser beam becomes amplified in the present invention as an optical path of light injected from an oscillation stage laser (MO) to a ring resonator of an amplification stage laser (PO) is shifted from an injection position, in each round trip, within a plane substantially perpendicular to a discharge direction.

Specifically, the above problems are solved by the below-described configuration of the present invention, as follows.

(1) A configuration of a narrow-band laser device for exposure apparatus being an injection-locked discharge excited laser device comprising a narrow-band oscillation stage laser (MO) and an amplification stage laser (PO) arranged with a ring-type resonator; wherein MO laser light from the oscillation stage laser (MO) is injected into the ring-type resonator of the amplification stage laser (PO); and the injected light is amplified in the amplification stage laser (PO) so that, in each round trip, an optical path shifts from an injection position in a direction substantially perpendicular to a plane (plane substantially parallel to the longitudinal direction of a discharge electrode and parallel to a discharge direction) of a discharge direction of the amplification stage laser (PO).

(2) The configuration in (1), wherein a mirror of the ring resonator of the amplification stage laser (PO) is arranged so that an optical path of light injected to the ring-type resonator shifts from the injection position, in each round trip, in a direction substantially perpendicular to the plane of the discharge direction of the amplification stage laser (PO).

(3) The configuration in (1), wherein the ring-type resonator is configured so that laser light makes round trips within the ring-type resonator via the same optical path, upon being injected at a predetermined angle relative to the ring-type resonator, and laser light is injected into the ring-type resonator at an angle different from the predetermined angle so that an optical path of light injected to the ring-type resonator shifts from the injection position, in each round trip, in the direction substantially perpendicular to the plane of the discharge direction of the amplification stage laser (PO).

(4) The configuration in (1), wherein a mirror of the ring-type resonator is provided as an odd number of mirrors equal to or greater than three, including an output coupling mirror, and mirror arrangement in the ring-type resonator and the injection position of the laser light in the ring-type resonator are selected so that an optical path of light injected into the ring-type resonator in even-numbered round trips is different from an optical path in odd-numbered round trips.

The present invention affords the following effects.

(1) The laser light beam shifts inside the ring resonator in each round trip, which allows as a result expanding the beam width.

This reduces in consequence the energy density of the laser light in the optical elements (OC, laser windows and high reflection mirrors) of the ring resonator of the amplification stage laser (PO). The life of the optical elements of the amplification stage laser (PO) is prolonged thereby.

(2) There is no beam expansion within the optical path of the ring resonator, and hence injection efficiency increases.

(3) In the optical path there is arranged no beam-expanding optical element, and hence there forms no unstable resonator. This reduces spatial coherence. When used as a light source for an exposure apparatus, therefore, the invention suppresses speckle on a mask.

DESCRIPTION OF THE PREFERRED EMBODIMENTS

Figure 1A:
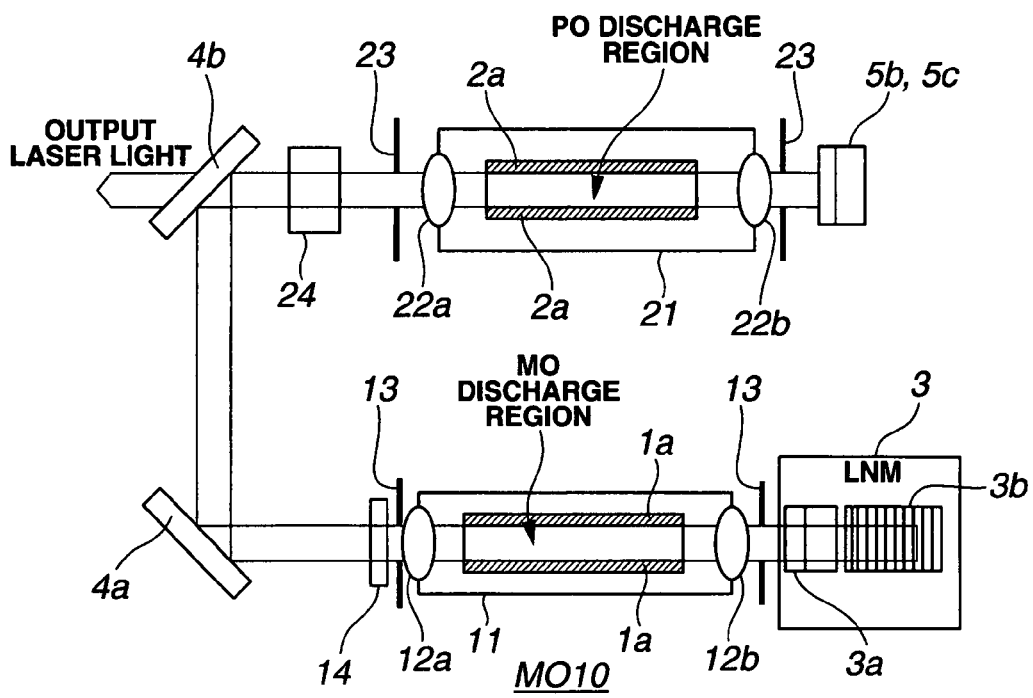
FIGS. 1A and 1B are diagrams illustrating the configuration of a first embodiment of the present invention.
Figure 1B:
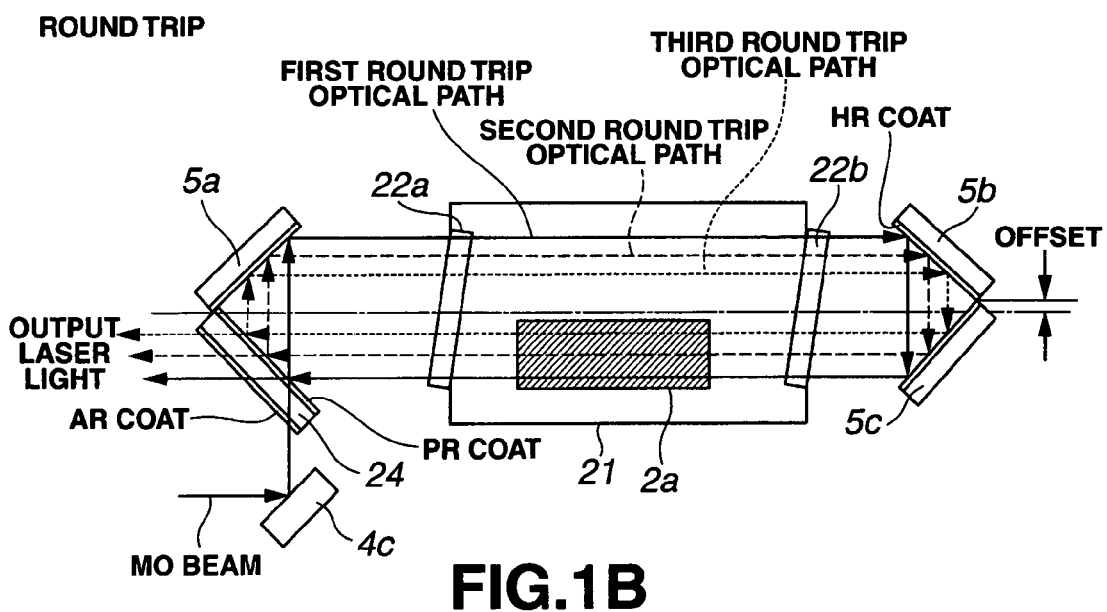

FIGS. 1A and 1B illustrate the configuration of a narrow-band laser device for exposure apparatus in a first embodiment of the present invention, in an instance where a rectangular ring resonator is arranged in an amplification stage laser 20 (PO). FIG. 1A is a side-view of the amplification stage laser (PO) 20, while FIG. 1B is a top-side view of the same.

Figure 10A:
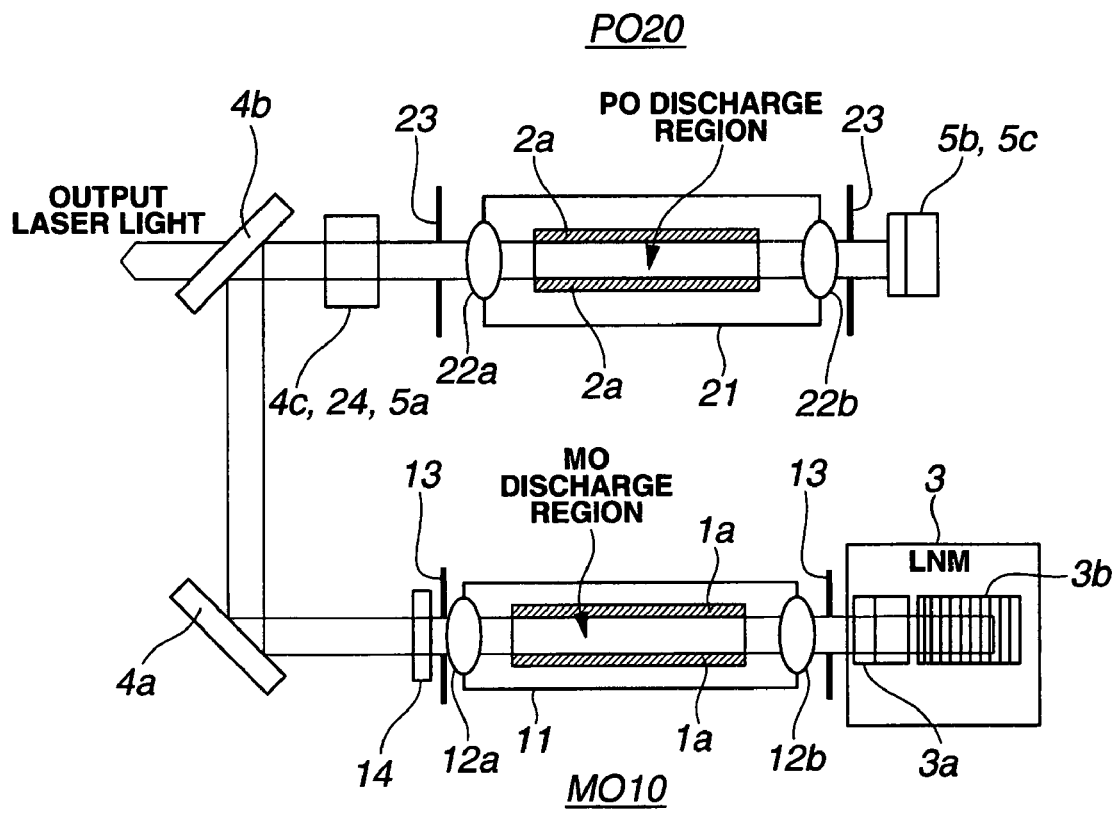
FIGS. 10A and 10B are diagrams illustrating a conventional example of a MOPO laser device.
Figure 10B:
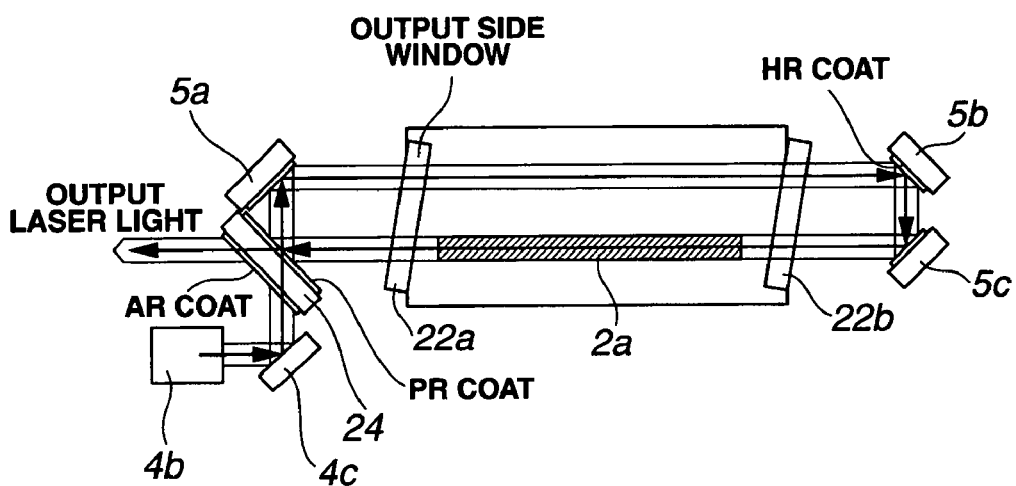
Figure 11:
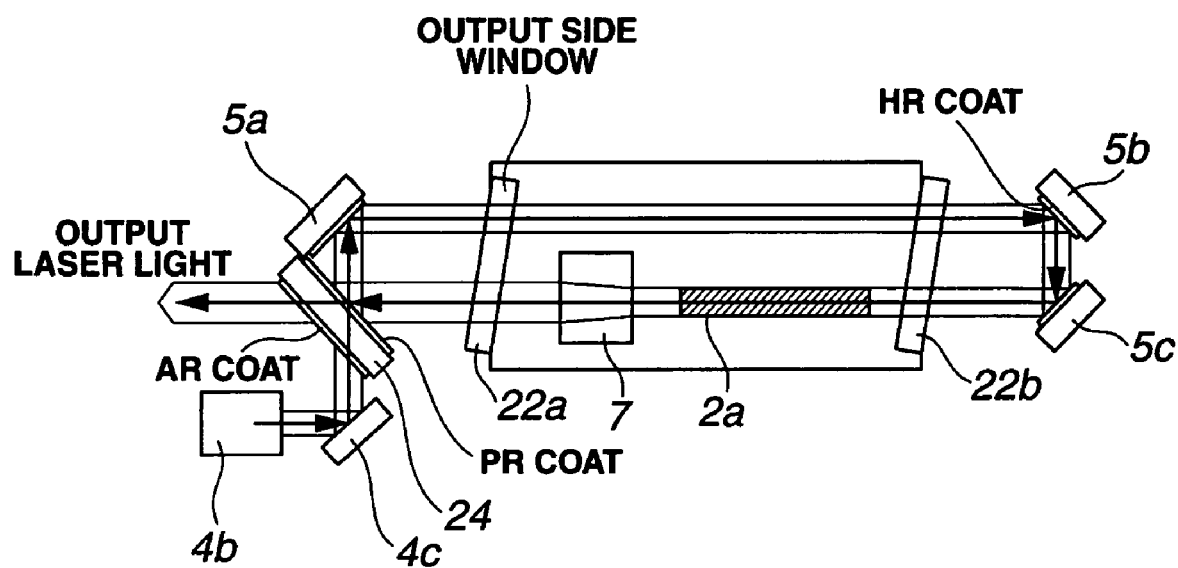
FIG. 11 is a diagram illustrating an instance where a beam-expanding optical element is arranged in the optical path of a ring resonator.

The configuration illustrated in FIG. 1A is identical to that illustrated in FIGS. 10A and 10B. Herein a laser beam emitted by an oscillation stage laser (MO) 10 functions as a seed laser beam, while the amplification stage laser (PO) 20 has a function of amplifying that seed laser light. The oscillation stage laser (MO) 10 and the amplification stage laser (PO) 20 have each respective laser chambers 11, 21, the interior whereof is filled with a laser gas. Inside each laser chamber there is arranged a pair of opposing electrodes 1a, 2a separated by a predetermined distance, such that discharge is effected through application of high-voltage pulses to these pairs of electrodes 1a, 2a.

In the chambers 11, 21 of the oscillation stage laser 10 and the amplification stage laser 20 there are arranged, respectively, window members 12a, 12b, 22a, 22b manufactured using a material having transmissivity at the wavelength of the laser light.

The oscillation stage laser 10 has a line-narrowing module (LNM) 3 that comprises an expanding prism 3a and a grating (diffraction grating) 3b, such that the optical elements in the line-narrowing module 3 and an OC 14 constitute a laser resonator.

MO laser light (seed laser beam) from the oscillation stage laser 10 is guided via high reflection mirrors 4a, 4b, 4c and is injected into the amplification stage laser (PO) 20.

As illustrated in FIG. 1B, the amplification stage laser (PO) 20 has provided therein a ring resonator comprising an OC 24 and high reflection mirrors 5a, 5b, 5c. In the ring resonator there is provided the OC 24, which is a partial reflection (PR) mirror having an antireflective (AR) film on the light-incidence side, while the other mirrors 5a, 5b, 5c that make up the ring resonator are coated with a high-reflective (HR) film.

In the present embodiment, the OC 24, which exhibits partial reflection for 45-degree incidence, and the high reflection mirror 5a, which exhibits high reflectance at 45 degrees, are arranged on the output side of the chamber 21 of the amplification stage laser (PO) 20 in such a way that the surface angle between the OC 24 and the high reflection mirror 5a is of 90 degrees.

Also, two high reflection mirrors 5b and 5c having high reflectance at 45 degrees are arranged on the rear side of the chamber 21 of the amplification stage laser (PO) 20 in such a way that the surface angle between the high reflection mirrors 5b and 5c is of 90 degrees. The mirror surfaces of the OC 24, the high reflection mirror 5a, and the high reflection mirrors 5b, 5c are arranged so as to be substantially parallel to the discharge direction, and to be tilted by about 45 degrees relative to the discharge plane (plane substantially parallel to the longitudinal direction of the discharge electrodes and parallel to the discharge direction).

That is, the mirror surfaces are arranged in such a way that the optical path of round trip light traveling between the opposing resonator mirrors (OC 24, high reflection mirror 5a and high reflection mirrors 5b, 5c) that flank the discharge electrodes 2a lies on a plane that is perpendicular to the discharge plane. The optical path direction of round trip light traveling between the above resonator mirrors is also called herein the optical axis direction of the ring resonator.

In conventional amplifying ring resonators, the intersection point (line) at which the mirror surfaces of the OC 24 and the high reflection mirror 5a come into contact, and the intersection point (line) at which the mirror surfaces of the high reflection mirrors 5b, 5c come into contact are on a plane that is parallel to the optical axis direction of the ring resonator, and are arranged so that the OC 24 and the high reflection mirror 5a on the output side, and the high reflection mirrors 5b, 5c on the rear side have left-right symmetry with respect to a plane perpendicular to the above optical axis direction. Seed light from the oscillation stage laser (MO) 10 is injected along the above optical axis direction.

When seed light is injected thus into a ring resonator configured as an ordinary ring resonator, the optical path of round trip traveling within the ring resonator is the same, irrespective of the number of round trips.

In such a case, as illustrated in FIG. 10B, beam width coincides substantially with the discharge width of the amplification stage laser (PO) 20. The load (energy density) increases in the output-side window 22a and the OC 24 of the amplification stage laser (PO) 20, thus shortening the life of the elements.

In the present embodiment, therefore, the trough line (hereinafter, intersection line) formed at the portion where the mirror surfaces of the OC 24 and the high reflection mirror 5a intersect, and the intersection line of the mirror surfaces of the high reflection mirrors 5b and 5c are arranged parallel to the optical axis direction of the resonator (parallel to the longitudinal direction axis of the discharge electrodes, when the optical path in the resonator is made to coincide with the longitudinal direction axis of the discharge electrodes), and are parallelly shifted so as to become offset relative to a plane parallel to the discharge direction of the discharge electrodes 2a, as illustrated in FIG. 1B. As explained above, the mirror surfaces of the OC 24, the high reflection mirror 5a, and the high reflection mirrors 5b, 5c are substantially parallel to the discharge direction, and hence the above intersection lines are parallel to the discharge direction.

That is, either the set of the OC 24 and the high reflection mirror 5a, or the set of the high reflection mirrors 5b and 5c are parallelly shifted and arranged in the perpendicular direction to the above plane in such a way that the intersection lines of the above mirror surfaces are not in the above same plane.

An injected beam (seed light) from the oscillation stage laser (MO) 10 is caused to enter an end portion of the OC 24 (for instance, at a position closest to, or furthest from, the high reflection mirror 5a), at an incidence angle of 45 degrees relative to the OC 24.

Part of the beam passes through the OC 24 and enters and is reflected by 45 degrees at the high reflection mirror 5a. The seed light traverses the window 22a and enters the laser chamber 21.

The seed light traverses the chamber 21 along an optical path substantially parallel to the longitudinal direction of the discharge electrodes 2a, passing through the chamber 21 without being amplified. The seed light is bent by the high reflection mirrors 5b and 5c, and enters the laser chamber 21 in such a way so as to pass through the discharge space of the discharge electrodes 2a.

Synchronizing with the seed light led into the discharge space of the discharge electrodes 2a, voltage from a power source not shown in the figure is applied between the discharge electrodes 2a to cause discharge between the electrodes 2a. The seed light is amplified as a result, whereupon the beam reaches the OC 24. The light transmitted at the OC 24 is outputted as output laser light (amplified light through discharge space in on round trip).

Meanwhile, the light reflected at the OC 24 is reflected by the total reflection mirror 5a once more and travels back into the laser chamber 21, through the interior of which it passes without being amplified, and enters the total reflection mirrors 5b and 5c, along an optical path parallelly shifted with respect to the optical path of the first round trip, within a plane perpendicular to the discharge direction.

The beam returns again to the laser chamber 21, along an optical path parallelly shifted by a predetermined distance with respect to the first round trip optical path P, traverses the discharge space and is amplified. The beam thus shifted by a certain fraction with respect to the first round trip optical path enters again the OC 24, the transmitted light is outputted as laser light, and the reflected light resonates again in the resonator, while for the third round trip, also, the optical path is parallelly shifted in the same way upon each round trip, thereby effecting amplification/oscillation of the amplified light.

Thus, arranging an optical resonator in which MO laser light (seed light) is injected into the ring resonator of the amplification stage laser (PO) 20, and in which the injected light is amplified in each round trip by being shifted from the injection position along a direction substantially perpendicular to the plane of the discharge direction, in each round trip, affords the following effects.

(1) In each round trip, the laser light beam inside the ring resonator shifts and the beam width widens, which reduces as a result the energy density of the laser light in the optical elements (OC, laser windows and high reflection mirrors) of the ring resonator of the amplification stage laser (PO) 20. This prolongs the life of the optical elements of the amplification stage laser (PO) 20.

(2) There is no beam expansion within the optical path of the ring resonator, and hence injection efficiency increases.

(3) In the optical path there are arranged no beam-expanding optical elements, and hence there forms no unstable resonator, which reduces spatial coherence as a result. When used as a light source for an exposure apparatus, therefore, the above configuration suppresses speckle on a mask.

(4) The laser light outputted in each round trip is parallel, and hence beam divergence of the output laser light as a whole does not widen in a direction perpendicular to the discharge direction.

Figure 2A:
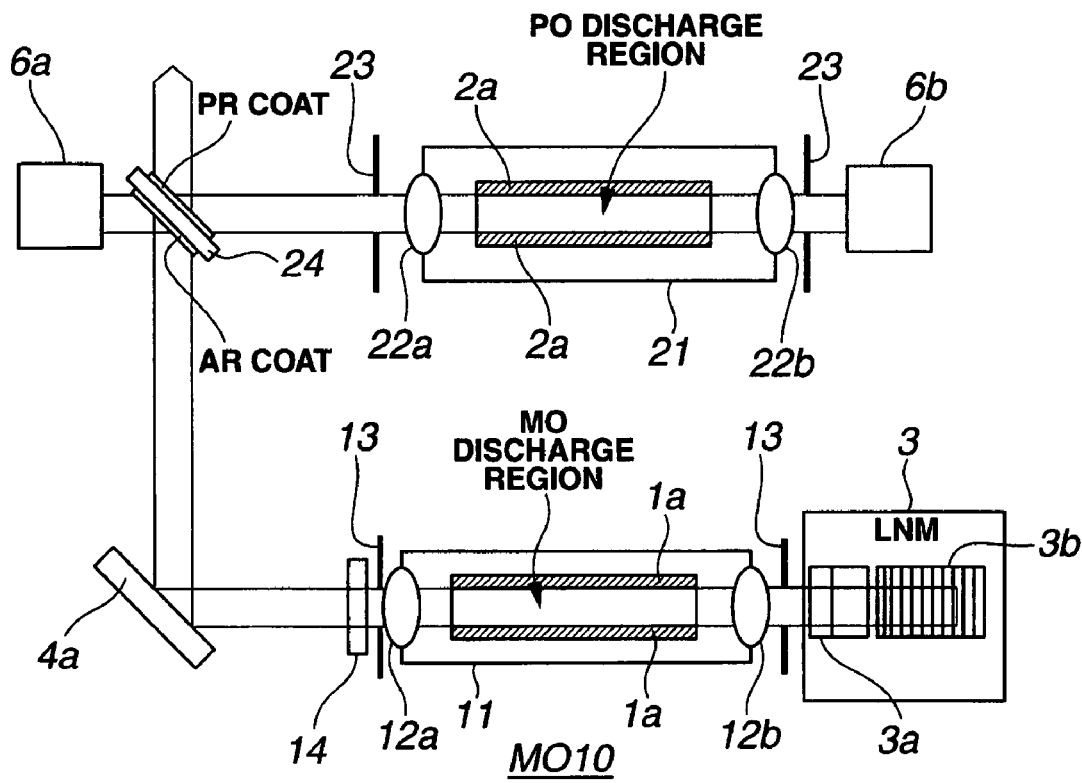
FIGS. 2A and 2B are diagrams illustrating the configuration of a second embodiment of the present invention.
Figure 2B:
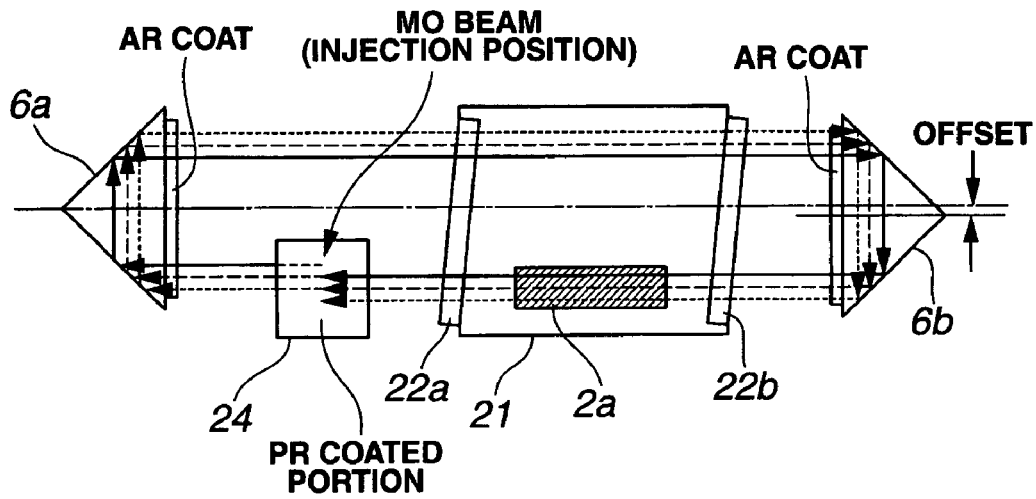

FIGS. 2A and 2B illustrate the configuration of a narrow-band laser device for exposure apparatus in a second embodiment of the present invention, in a modification of the first embodiment where a rectangular ring resonator is arranged in the amplification stage laser 20 (PO). FIG. 2A is a side-view of the amplification stage laser (PO) 20, while FIG. 2B is a top-side view of the same.

The configuration of the present embodiment is basically identical to that of the first embodiment, except that herein the resonator mirrors are replaced by total reflection right-angle prisms 6a, 6b.

A laser beam emitted by an oscillation stage laser (MO) 10 functions as a seed laser beam, while the amplification stage laser (PO) 20 has a function of amplifying that seed laser light. The oscillation stage laser (MO) 10 and the amplification stage laser (PO) 20 have each respective laser chambers 11, 21, the interior whereof is filled with a laser gas. Inside each laser chamber there is arranged a pair of opposing electrodes 1a, 2a separated by a predetermined distance, such that discharge is effected through application of high-voltage pulses to these pairs of electrodes 1a, 2a.

Features diverging from the first embodiment are explained below.

In the present embodiment: (1) two total reflection right-angle prisms 6a, 6b coated with an antireflective (AR) film are arranged as the optical elements of the ring resonator; (2) within the optical path of the ring resonator there is arranged an OC 24 coated with a partially reflective (PR) film; (3) the ridges of the respective apex portions of the total reflection right-angle prism 6a and the total reflection right-angle prism 6b are arranged so as to be offset with respect to the longitudinal direction axis of the discharge electrodes, as was the case in the first embodiment. That is, the ridge lines on the respective apex portions of the total reflection right-angle prism 6a and the total reflection right-angle prism 6b are arranged parallel to the optical axis direction of the resonator (parallel to the longitudinal direction axis of the discharge electrodes, when the optical path in the resonator is parallel to the longitudinal direction axis of the discharge electrodes), and are arranged parallelly shifted so as to become offset relative to a plane parallel to the discharge direction of the discharge electrodes 2a (arranged parallelly shifted and in the perpendicular direction to the above plane in such a way that the above ridge lines are not in the above same plane).

The ring resonator of the amplification stage laser (PO) 20 comprises the total reflection right-angle prisms 6a, 6b coated with an antireflective (AR) film, as described above, so that the total reflection surfaces of the total reflection right-angle prisms are arranged to be substantially parallel to the discharge direction, and tilted by substantially 45 degrees relative to the discharge plane (plane substantially parallel to the longitudinal direction of the discharge electrode and parallel to the discharge direction).

That is, the total reflection right-angle prisms 6a, 6b are arranged in such a way the optical path of round trip traveling between the total reflection right-angle prisms 6a, 6b that flank the discharge electrodes 2a is included in a plane that is perpendicular to the discharge plane, while, as in the first embodiment, the optical path from the injection position of the injected light shifts, with each round trip, in a direction substantially perpendicular to the plane of the discharge direction of the amplification stage laser (PO) 20.

Specifically, as illustrated in FIG. 2B, an MO beam (seed light) is reflected by a high reflection mirror 4a to enter an end portion of the OC 24 having one face coated with a partially reflective (PR) film and another face coated with an antireflective (AR) film.

Part of the seed light is reflected at the OC 24 and enters the total reflection right-angle prism 6a. The incidence and exit surfaces of the total reflection right-angle prism 6a are coated with an antireflective (AR) film. The seed light is totally reflected through Fresnel reflection at two surfaces of the prism 6a.

The seed light traverses the window 22a and enters the laser chamber 21. The seed light traverses the chamber 21 along an optical path substantially parallel to the discharge electrodes 2a, passes through the chamber 21 without being amplified, and enters the total reflection right-angle prism 6b. The seed light is totally reflected by two surfaces of the right-angle prism 6b and enters again the laser chamber 21, via the window 22b, so that the optical path coincides with the discharge space of the discharge electrodes 2a. Synchronizing with the seed light led into the discharge space of the discharge electrodes 2a, voltage from a power source not shown in the figure is applied between the discharge electrodes 2a to cause discharge between the electrodes 2a.

The seed light becomes amplified thereby, and a laser beam enters the PR coated portion of the OC 24. The light reflected at the OC 24 is outputted as output laser light (amplified light through the discharge space in one round trip).

The transmitted light is returned by the total reflection right-angle prism 6a again into the laser chamber 21, along an optical path shifted parallelly relative to the optical path of the first round trip, traverses the chamber 21 without being amplified, and enters the total reflection right-angle prism 6b. The light enters again the laser chamber 21, along an optical path parallelly shifted by a predetermined distance with respect to the first round trip, traverses the discharge space and is amplified.

The beam thus shifted by a certain fraction with respect to the first round trip enters again the PR coated portion of the OC 24, the reflected light is outputted as laser light, the transmitted light resonates again in the resonator, while for the third round trip, also, the optical path is parallelly shifted in the same way, effecting thereby amplification/oscillation of the amplified light.

The present embodiment affords the following effects.

(1) The output laser light beam shifts for each round trip, which reduces as a result the energy density of the laser light in the optical elements (OC, laser window) of the ring resonator of the amplification stage laser (PO). The life of the optical elements of the amplification stage laser (PO) is prolonged thereby.

(2) Alignment is easy since the ring resonator comprises total reflection right-angle prisms.

(3) The laser light outputted in each round trip is parallel, and hence beam divergence of the output laser light as a whole does not widen in a direction perpendicular to the discharge direction.

Figure 3:
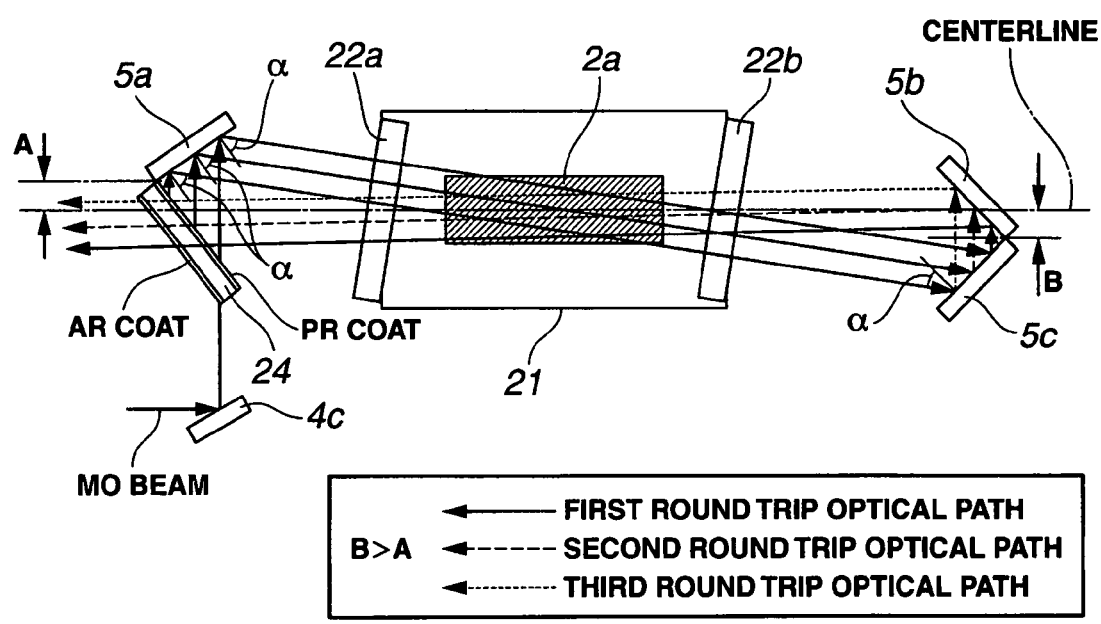
FIG. 3 is a diagram illustrating the configuration of a third embodiment of the present invention.

FIG. 3 illustrates the configuration of a narrow-band laser device for exposure apparatus in a third embodiment of the present invention, in an instance where the positions of the two sets of fold mirrors in the first embodiment are offset.

The figure illustrates a top view of an amplification stage laser (PO) 20. The configuration and the like of an oscillation stage laser (MO) are omitted herein, being identical to that of FIGS. 1A and 1B. A laser beam emitted by an oscillation stage laser (MO) 10 functions as a seed laser beam, while the amplification stage laser (PO) 20 has a function of amplifying that seed laser light. The oscillation stage laser (MO) 10 and the amplification stage laser (PO) 20 have each respective laser chambers 11, 21, the interior whereof is filled with a laser gas. Inside each laser chamber there is arranged a pair of opposing electrodes 1a, 2a separated by a predetermined distance, such that discharge is effected through application of high-voltage pulses to these pairs of electrodes 1a, 2a.

The features that diverge from the first embodiment are explained below.

In the present embodiment, (1) there is used, as a ring resonator, a type of resonator in which amplification takes place while light passes through the discharge space both on the onward and return passes. (2) The intersection line of the surfaces of the OC 24 and the high reflection mirror 5a, and the intersection line of the surfaces of the high reflection mirrors 5b, 5c are arranged parallel to the optical axis direction of the resonator (parallel to the longitudinal direction axis of the discharge electrodes), and are arranged parallelly shifted so as to become offset relative to a plane parallel to the discharge direction of the discharge electrodes 2a.

That is, the above plane is a plane parallel to the discharge direction of the discharge electrodes 2a, and parallel to the longitudinal direction axis of the discharge electrodes, so that values A and B different from each other, wherein A is the distance from the plane to the intersection line of the OC 24 and the high reflection mirror 5a, and B is the distance from the plane to the intersection line of the high reflection mirrors 5b, 5c, satisfy (B>A).

The mirror surfaces of the OC 24, the high reflection mirror 5a, and the high reflection mirrors 5b, 5c are substantially parallel to the discharge direction; herein, the OC 24 and the high reflection mirror 5b are arranged tilted by about 45 degrees relative to the discharge plane (plane substantially parallel to the longitudinal direction of the discharge electrodes and parallel to the discharge direction), while the high reflection mirrors 5a, 5c are arranged tilted at an angle of $\alpha$ degrees ($\alpha$<45 degrees) relative to the discharge plane.

Every time that light makes round trip, therefore, the optical path shifts in the ring resonator within a plane perpendicular to the plane of the discharge direction, as illustrated in the figure. In the present embodiment, moreover, the optical path within the ring resonator crosses the discharge region both on the onward and return passes.

The operation of the present embodiment is explained next.

The high reflection mirror 4c causes an MO beam (seed light) to enter, at an incidence angle of 45 degrees, an end portion of the OC 24 of the amplification stage laser (PO) 20.

The MO beam passes through the 45-degree OC 24, which is coated with a partially reflective (PR) film, enters the high reflection mirror 5a at an incidence angle $\alpha$ (an angle smaller than 45 degrees by several mrad), traverses the window 22a, and enters at a tilt the discharge space of the laser chamber 21 of the amplification stage laser (PO) 20.

The discharge electrodes 2a discharge synchronizing with the seed light, through application of voltage between the discharge electrodes 2a. The seed light passing through the discharge space is amplified, traverses the window 22b, and enters the high reflection mirror 5b at the incidence angle $\alpha$. The laser beam enters and is reflected, at an incidence angle of 45 degrees, by the high reflection mirror 5c, passes through the window 22a along an optical path parallel to the longitudinal direction of the discharge electrodes 2a, is led again into the discharge space, where discharge takes place, and is amplified.

The optical path of the laser beam shifts from the injection portion (end portion of the OC 24) by a certain fraction, within a plane perpendicular to the plane of the discharge direction. Part of the laser beam striking the OC 24 is transmitted therethrough as laser output light (one round trip light), while another part is reflected and enters again the high reflection mirror 5a, traverses similarly the discharge space along an optical path parallelly shifted with respect to the optical path of the first round trip, and is made to pass again, by the high reflection mirrors 5b and 5c, through the discharge space along an optical path parallelly shifted with respect to the optical path of the first round trip. The beam, shifted from the first round trip by a certain fraction, enters again the PR coated portion of the OC 24, whereupon the transmitted light is outputted as laser light, and the reflected light resonates again in the resonator, while for the third round trip, also, the optical path is parallelly shifted in the same way upon each round trip, thereby effecting amplification/oscillation of the amplified light.

The present embodiment affords the following effects.

(1) The output laser light beam shifts for each round trip, which reduces as a result the energy density of the laser light in the optical elements (OC, laser window and high reflection mirrors) of the ring resonator of the amplification stage laser (PO). The life of the optical elements of the amplification stage laser (PO) is prolonged thereby.

(2) The laser beam is amplified both on the onward and return passes, which results in high amplification efficiency.

(3) The laser light outputted in each round trip is parallel, and hence beam divergence of the output laser light as a whole does not widen in a direction perpendicular to the discharge direction.

In the above embodiment an instance has been explained wherein mirrors are used in the resonator so that laser light is returned to a laser chamber by two high reflection mirrors. However, the same effect can be achieved if the laser beam is returned using total reflection prisms, such as those of the second embodiment, on the basis of Fresnel reflection at an angle somewhat smaller (several mrad) than 45 degrees.

Figure 4:
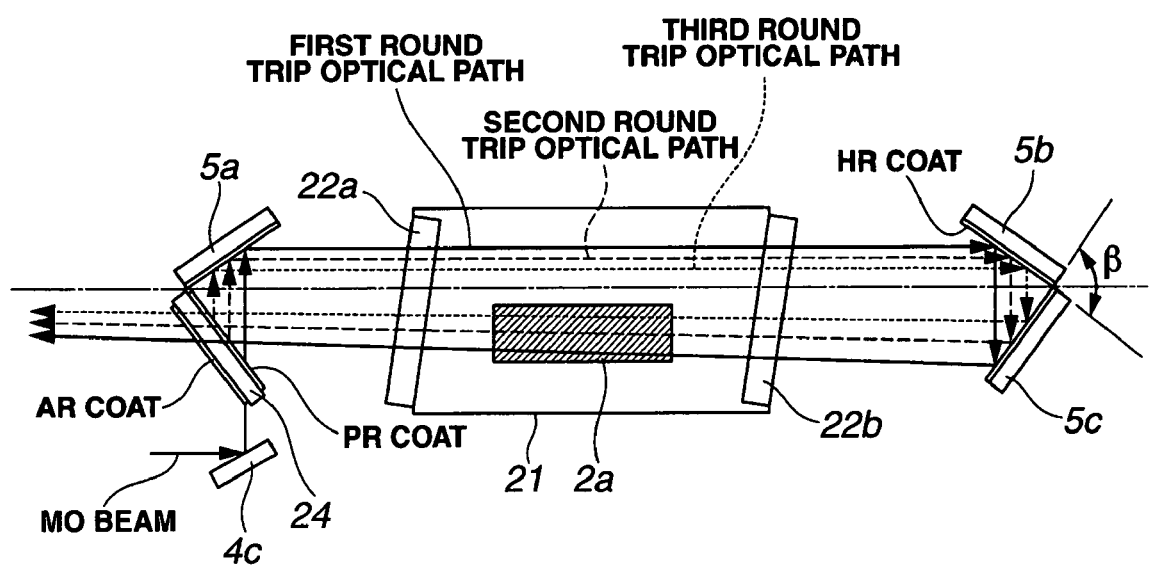
FIG. 4 is a diagram illustrating the configuration of a fourth embodiment of the present invention.

FIG. 4 illustrates the configuration of a narrow-band laser device for exposure apparatus in a fourth embodiment of the present invention, showing an instance where the axis of one mirror in the rectangular ring resonator of FIG. 1 is displaced.

The figure illustrates a top view of an amplification stage laser (PO) 20. The configuration and the like of an oscillation stage laser (MO) are omitted herein, being identical to that of FIG. 1. That is, a laser beam emitted by an oscillation stage laser (MO) 10 functions as a seed laser beam, while an amplification stage laser (PO) 20 has a function of amplifying that seed laser light. The oscillation stage laser (MO) 10 and the amplification stage laser (PO) 20 have each respective laser chambers 11, 21, the interior whereof is filled with a laser gas. Inside each laser chamber there is arranged a pair of opposing electrodes 1a, 2a separated by a predetermined distance, such that discharge is effected through application of high-voltage pulses to these pairs of electrodes 1a, 2a.

The features that diverge from the first embodiment are explained below.

On the output side of the chamber 21 of the amplification stage laser (PO) 20 there is arranged an OC 24, which exhibits partial reflection for 45-degree incidence, and a high reflection mirror 5a, which exhibits high reflectance at 45 degrees, with the surfaces of the OC 24 and the high reflection mirror 5a forming an angle of 90 degrees between them.

Meanwhile, the high reflection mirrors 5b and 5c having high reflectance at 45 degrees are provided at the rear side of the laser chamber 21, so that the surfaces of the high reflection mirrors 5b and 5c are arranged to form between them an angle β slightly smaller than 90 degrees.

The mirror surfaces of the OC 24, the high reflection mirror 5a, and the high reflection mirrors 5b, 5c are arranged so as to be substantially parallel to the discharge direction; the OC 24 and the high reflection mirrors 5a and 5b are arranged to be tilted by substantially 45 degrees relative to the discharge plane (plane substantially parallel to the longitudinal direction of the discharge electrode and parallel to the discharge direction), while the high reflection mirror 5c is arranged tilted at an angle slightly smaller than 45 degrees relative to the discharge plane.

In the present embodiment, the intersection line of the surfaces of the OC 24 and the high reflection mirror 5a, and the intersection line of the surfaces of the high reflection mirrors 5b, 5c are arranged parallel to the optical axis direction of the resonator (parallel to the longitudinal direction axis of the discharge electrodes 2a), without offset relative to the plane parallel to the discharge direction. That is, the intersection line of the surfaces of the OC 24 and the high reflection mirror 5a, and the intersection line of the surfaces of the high reflection mirrors 5b, 5c are arranged so as to be at an identical distance from the above plane.

The operation of the present embodiment is explained next.

The high reflection mirror 4c causes an MO beam (seed light) to enter, at an incidence angle of 45 degrees, an end portion of the OC 24 of the amplification stage laser (PO) 20. Part of the beam passes through the OC 24 and enters and is reflected by 45 degrees at the high reflection mirror 5a. The seed light traverses the window 22a and enters the laser chamber 21. The seed light traverses the chamber 21 substantially parallel to the longitudinal direction axis of the discharge electrodes 2a, without being amplified. The seed light enters and is reflected by 45 degrees at the high reflection mirror 5b and enters and is reflected at the high reflection mirror 5c by an angle slightly smaller than 45 degrees.

When the incidence and reflection angle is 45 degrees, the angle β is of 90 degrees, and the light advances as shown by the arrows, returning to the OC at a position that coincides with the injection position in the OC.

In the present invention, on the other hand, since the reflection angle of the high reflection mirror 5c is slightly smaller than 45 degrees, the laser beam is amplified as it passes through the discharge space and enters the OC 24 at a position shifted from the injection position. The light transmitted at the OC 24 is outputted as output laser light (amplified light through the discharge space in one round trip).

The total reflection mirror 5a returns the light reflected at the OC 24 back to the laser chamber 21 once more, along an optical path slightly tilted with respect to the optical path of the first round trip. The light beam passes through the laser chamber 21 without being amplified, and enters the total reflection mirrors 5b and 5c. The beam returns again to the laser chamber 21, along an optical path parallelly shifted by a predetermined distance with respect to the first round trip, traverses the discharge space and is amplified.

The beam thus shifted by a certain fraction with respect to the first round trip enters again the OC 24, the transmitted light is outputted as laser light, and the reflected light resonates again in the resonator, while for the third round trip, also, the optical path is slantingly shifted in the same way upon each round trip, thereby effecting amplification/oscillation of the amplified light.

In the present embodiment, thus, MO laser light (seed light) is injected into the ring resonator of the amplification stage laser (PO) 20, so that the injected light becomes amplified, in each round trip, as the injection position shifts in a direction substantially perpendicular to the plane of the discharge direction, affording as a result the following effects.

(1) In each round trip, the laser light beam inside the ring resonator shifts and the beam width widens, which reduces as a result the energy density of the laser light in the optical elements (OC, laser windows and high reflection mirrors) of the ring resonator of the amplification stage laser (PO) 20. This prolongs, therefore, the life of the PO optical element.

The characteristic of the present embodiment differs from those of the first through third embodiments illustrated in FIGS. 1 to 3 in that herein the exit angle of the output light veers slightly in each round trip, as a result of which beam divergence widens in the direction perpendicular to the discharge direction.

In the present embodiment, the position of the beam shifts in each round trip as a result of reflection at the high reflection mirror 5c taking place at a reflection angle slightly smaller than 45 degrees, within a plane perpendicular to the discharge direction. The present embodiment, however, is not limited thereto, and the beam position on the OC may also shift in each round trip by modifying the incidence and reflection angle of at least one of the mirrors that make up the ring resonator vis-à-vis the incidence and reflection angles (herein, 45 degrees) of the other mirrors.

The angle of at least one of the mirrors in the ring resonator illustrated in FIG. 3, where amplification occurs in the onward and returns passes, may also be changed, as in the present embodiment. The beam position on the OC shifts thereby in each round trip.

Figure 5:
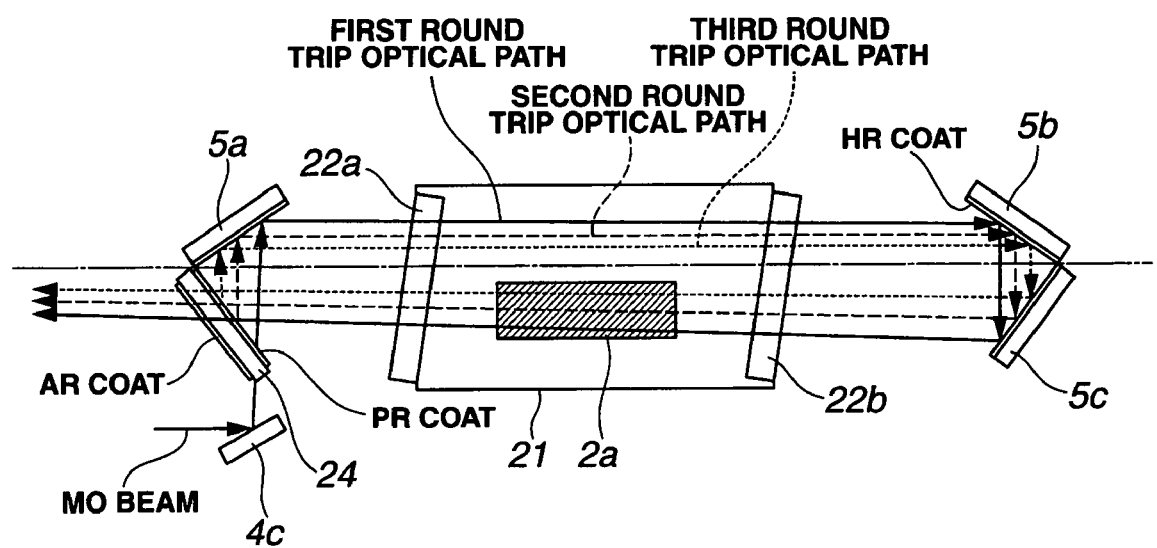
FIG. 5 is a diagram illustrating the configuration of a fifth embodiment of the present invention.

FIG. 5 illustrates the configuration of a narrow-band laser device for exposure apparatus in a fifth embodiment of the present invention, showing an instance where the incidence angle of injection light onto the ring resonator of the amplification stage laser (PO) is swerved vis-à-vis the ordinary incidence angle.

The figure illustrates a top view of an amplification stage laser (PO) 20. The configuration and the like of an oscillation stage laser (MO) are omitted herein, being identical to that of FIG. 1. A laser beam emitted by an oscillation stage laser (MO) 10 functions as a seed laser beam, while the amplification stage laser (PO) 20 has a function of amplifying that seed laser light.

The features that diverge from the first embodiment are explained below.

On the output side of the laser chamber 21 of the amplification stage laser (PO) 20 there is arranged an OC 24, which exhibits partial reflection for 45-degree incidence, and a high reflection mirror 5a, which exhibits high reflectance at 45 degrees, with the surfaces of the OC 24 and the high reflection mirror 5a forming an angle of 90 degrees between them.

Also, two high reflection mirrors 5b and 5c having high reflectance at 45 degrees are arranged on the rear side of the chamber 21 of the amplification stage laser (PO) 20 in such a way that the surface angle between the high reflection mirrors 5b and 5c is of 90 degrees. The mirror surfaces of the OC 24, and of the high reflection mirrors 5a, 5b and 5c are set so as to be parallel to the discharge direction of the electrodes, while the OC 24, and the high reflection mirrors 5a, 5b and 5c are arranged to be tilted by substantially 45 degrees relative to the discharge plane (plane substantially parallel to the longitudinal direction of the discharge electrode and parallel to the discharge direction).

In the present embodiment, the intersection line of the surfaces of the OC 24 and the high reflection mirror 5a, and the intersection line of the surfaces of the high reflection mirrors 5b, 5c are arranged parallel to the optical axis direction of the resonator (parallel to the longitudinal direction axis of the discharge electrodes 2a), without offset relative to the plane parallel to the discharge direction of the discharge electrodes 2a. That is, the intersection line of the surfaces of the OC 24 and the high reflection mirror 5a, and the intersection line of the surfaces of the high reflection mirrors 5b, 5c are arranged to be at an identical distance from the above plane, and so that the output side and the rear side have left-right symmetry.

Such a configuration is identical to that of an ordinary ring resonator for amplification. As illustrated in FIG. 10B, when seed light is injected at a predetermined angle (for instance, 45 degrees) into the OC 24, the optical path of round trip light traveling within the ring resonator becomes identical irrespective of the number of round trip. The load (energy density) in the output-side window 22a and OC 24 of the amplification stage laser (PO) 20 increases as a result, which shortens element life.

In the present embodiment, therefore, seed light from the oscillation stage laser (MO) is injected at an angle different from the above predetermined angle. Specifically, laser light is injected into the ring resonator at an angle that differs from the above predetermined angle in such a way that the optical path of the light injected into the resonator shifts from the injection position, in each round trip, in a direction substantially perpendicular to the plane of the discharge direction of the amplification stage laser (PO) 20. For instance, the high reflection mirror 4c causes an MO beam (seed light) to enter an end portion of the OC 24 at an incidence angle somewhat larger than 45 degrees.

The operation of the present embodiment is explained next.

When an MO beam (seed light) enters thus an end portion of the OC 24 at an incidence angle somewhat larger than 45 degrees, part of the beam is transmitted through the OC 24 while part of the beam enters the high reflection mirror 5a. The seed light traverses the window 22a and enters the laser chamber 21.

The seed light traverses the chamber 21 along an optical path substantially parallel (slightly oblique) to the longitudinal direction axis of the discharge electrodes 2a, without being amplified. The seed light is bent by the high reflection mirrors 5b and 5c, and enters the laser chamber 21, via the window 22b, in such a way so as to pass through the discharge space of the discharge electrodes 2a.

Synchronizing with the seed light led into the discharge space of the discharge electrodes 2a, voltage from a power source not shown in the figure is applied to the discharge electrodes 2a, to cause discharge between the electrodes 2a.

The seed light is amplified as a result, whereupon the beam reaches the OC 24. The light transmitted at the OC 24 is outputted as output laser light (amplified light through the discharge space in one round trip).

The total reflection mirror 5a returns the reflected light back to the laser chamber 21 once more, along an optical path slightly tilted with respect to the optical path of the first round trip. The light passes thereupon through the chamber 21 without being amplified, and enters the total reflection mirrors 5b and 5c. The beam returns once more to the laser chamber 21, along an optical path parallelly shifted by a predetermined distance with respect to the first round trip optical path, traverses the discharge space and is amplified. The beam thus shifted by a certain fraction with respect to the first round trip optical path enters again onto the OC 24, the transmitted light is outputted as laser light, and the reflected light resonates again in the resonator, and for the third round trip optical path, also, the optical path is parallelly shifted in the same way upon each round trip, thereby effecting amplification/oscillation of the amplified light.

In the present embodiment, thus, MO laser light is injected obliquely into the ring resonator of the amplification stage laser (PO), so that the injected light becomes amplified, in each round trip, as the injection position shifts in a direction substantially perpendicular to the plane of the discharge direction of the amplification stage laser (PO), affording as a result the following effects.

(1) In each round trip, the laser light beam inside the ring resonator shifts, widening the beam width, which reduces as a result the energy density of the laser light in the optical elements (OC, laser windows and high reflection mirrors) of the ring resonator of the amplification stage laser (PO). The life of the optical elements of the amplification stage laser (PO) is prolonged thereby.

(2) There is no beam expansion within the optical path of the ring resonator, and hence injection efficiency increases.

(3) The laser light outputted in each round trip is parallel, and hence beam divergence of the output laser light as a whole does not widen in a direction perpendicular to the discharge direction.

Even in a ring resonator such as the one in the third embodiment (FIG. 3), wherein amplification takes place in the onward and return passes, injection light may also be injected obliquely, so that the beam position on the OC 24 shifts in each round trip as in the present embodiment.

Figure 6:
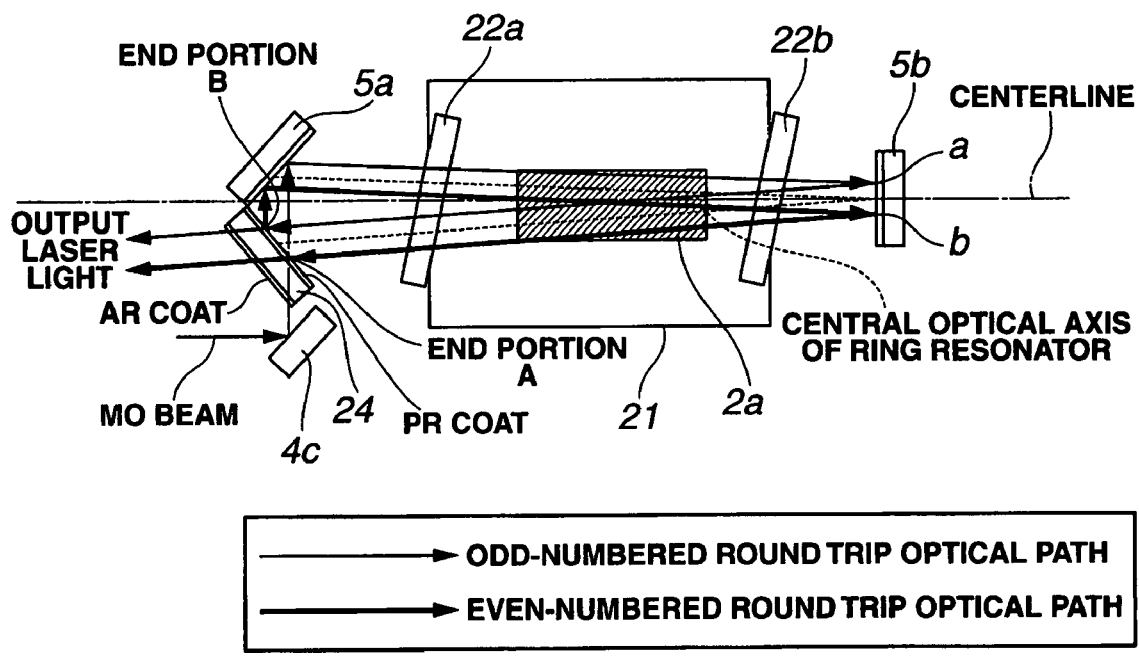
FIG. 6 is a diagram illustrating the configuration of a sixth embodiment of the present invention.

FIG. 6 illustrates the configuration of a narrow-band laser device for exposure apparatus in a sixth embodiment of the present invention, showing an instance where a ring resonator comprising three mirrors is used in the amplification stage laser (PO), so that, by displacing the injection of seed light, the optical path of light injected into the resonator in even-numbered round trip is different from the optical path in odd-numbered round trip.

The figure illustrates a top view of an amplification stage laser (PO) 20. The configuration and the like of an oscillation stage laser (MO) are omitted herein, being identical to that of FIG. 1. A laser beam emitted by an oscillation stage laser (MO) 10 functions as a seed laser beam, while the amplification stage laser (PO) 20 has a function of amplifying that seed laser light.

In FIG. 6, an OC 24 onto which seed light enters and is partially reflected an angle slightly smaller than 45 degrees, and a high reflection mirror 5a at which seed light is reflected with high reflectance at an incidence angle slightly smaller than 45 degrees, are arranged at the output side of a chamber 21 of the amplification stage laser (PO) 20 in such a way that the surfaces of the OC 24 and the high reflection mirror 5a form an angle smaller than about 90 degrees.

Also, a high reflection mirror 5b for high reflectance is arranged on the rear side of the chamber 21 of the amplification stage laser (PO) 20, in such a way that the incidence angle thereon is substantially 0 degrees (from 3 to 6 mrad).

The mirror surfaces of the OC 24 and the high reflection mirrors 5a and 5b are set so as to be parallel to the discharge direction of the electrodes; herein, the mirror surfaces of the OC 24 and the high reflection mirror 5a are arranged to be parallel to the above discharge direction and to form an identical angle relative to a plane that is parallel to the longitudinal direction axis of the discharge electrodes 2a, while the high reflection mirror 5c is arranged perpendicular to that plane.

That is, the OC 24 and the high reflection mirrors 5a and 5b are arranged so that the optical path in the ring resonator is on a plane that includes the discharge region and is perpendicular to the discharge direction.

In the exemplified ring resonator, the intersection line of the mirror surfaces of the OC 24 and the high reflection mirror 5a, and the centerline of the mirror surface of the high reflection mirror 5b include the longitudinal direction axis of the discharge electrodes 2a, and lie on a same plane parallel to the discharge direction. Seed light is injected parallel to a plane that is within a plane perpendicular to a plane of the discharge direction and that includes the discharge region between electrodes.

In FIG. 6, the high reflection mirror 4c causes an MO beam (seed light) to enter an end portion A of the OC 24 of the amplification stage laser (PO) 20, along a plane that is within a plane perpendicular to a plane of the discharge direction and that includes the discharge region between electrodes. The incidence angle on the surface of the OC 24 is an angle somewhat smaller than 45 degrees.

Part of the beam passes through the OC 24 and enters the high reflection mirror 5a. The seed light traverses the window 22a and enters the laser chamber 21. The seed light passes obliquely between the discharge electrodes 2a. Synchronizing with the seed light, voltage from a power source not shown in the figure is applied to cause discharge between the electrodes 2a. Seed light is amplified thereby and traverses the chamber 21.

The seed light is reflected with high reflectance by an end portion a of the high reflection mirror 5b and enters the laser chamber 21 again, via the window 22b, in such a way that the light passes through the discharge space of the discharge electrodes 2a. The incident seed light is led into the discharge space of the electrodes 2a, is amplified, and reaches the OC 24.

The beam enters the OC 24 at an end portion B opposite the above end portion A, with respect to a central optical axis (in this example, the axis denoted as a dotted line in the figure and running centrally between the optical path of light injected into the resonator in an odd-numbered round trip and the optical path in an even-numbered round trip).

The light transmitted at the OC 24 is outputted as output laser light (amplified light through the discharge space in one round trip). The total reflection mirror 5a returns the light reflected at the OC 24 back to the laser chamber 21 once more, along an optical path mutually parallel to the optical path of the first round trip, is amplified, passes through the chamber 21, and is reflected with high reflectance at the end portion b of the total reflection mirror 5b.

The beam returns again to the laser chamber 21, along an optical axis mutually parallel to the optical path of the first round trip, traverses the discharge space and is amplified. This amplified light enters a position (end portion A) of the OC 24 that coincides with the injection position of the seed light, whereupon the transmitted light is outputted as laser light of a second round trip.

The reflected light proceeds through the ring resonator, as light of a third round trip, and is amplified. The optical axis of the third round trip optical path is the same optical axis of the first round trip optical path.

In the ring resonator, specifically, the laser beam enters alternately the end portion A and the end portion B on both sides of the OC 24 relative to the central optical axis, and enters the end portion a and end portion b of the high reflection mirror 5b, on both sides of the central optical axis.

In the present embodiment, thus, the optical paths of odd-numbered round trips coincide, and the optical paths of even-numbered round trips coincide, respectively.

Arranging as the ring resonator a ring resonator having three mirrors, and selecting the mirror arrangement of the above ring-type resonator, as well as the injection position of the laser light into the ring-type resonator, in such a way that the optical path of light injected into the resonator in odd-numbered round trips is different from the optical path in even-numbered round trips, affords the following effects.

(1) The beam is expanded since the beam position of the amplified output light in odd-numbered round trips is different from that in even-numbered round trips. This reduces therefore the energy density of the laser light in the optical elements (OC, laser windows and high reflection mirrors) of the ring resonator of the amplification stage laser (PO). The life of the PO optical elements is prolonged as a result.

(2) There is no beam expansion within the optical path of the ring resonator, and hence injection efficiency increases.

(3) The laser light outputted in each round trip is parallel, and hence beam divergence of the output laser light as a whole does not widen in a direction perpendicular to the discharge direction.

(4) Since the optical axes coincide, respectively, for the odd-numbered round trips and the even-numbered round trips, resonance occurs without vignetting, even when the number of round trips in the resonator increases. This affords as a result a longer pulse width than in the above embodiments.

Figure 7:
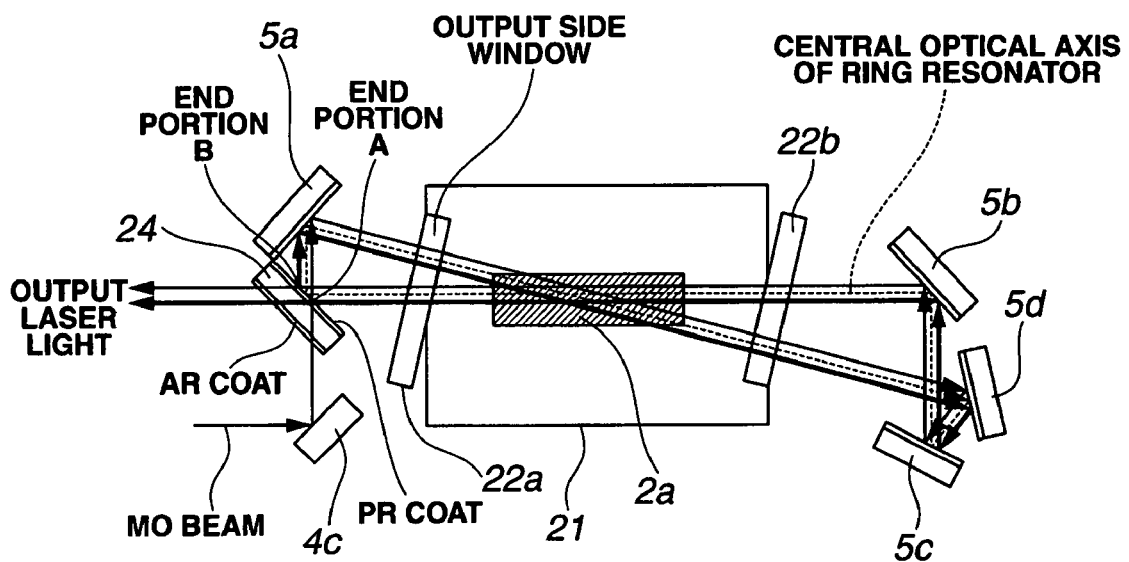
FIG. 7 is a diagram illustrating the configuration of a seventh embodiment of the present invention.
Figure 8:
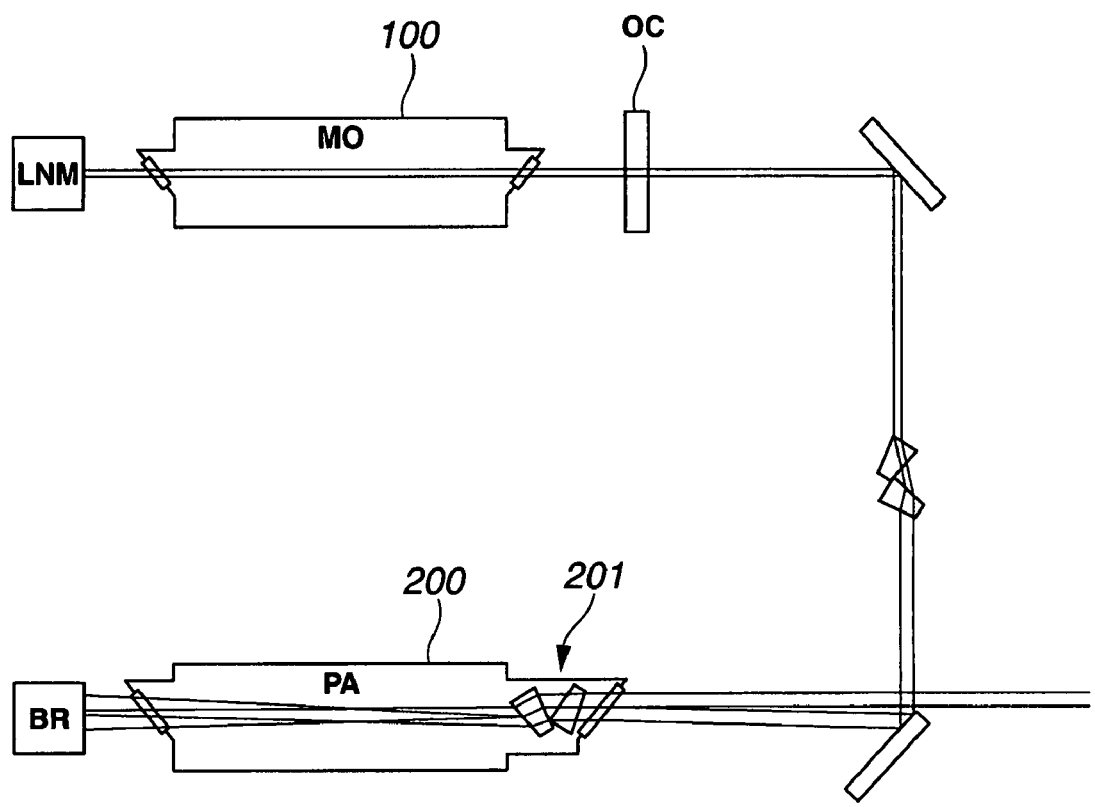
FIG. 8 is a diagram illustrating a conventional example (1) described in Japanese Translation of PCT Application No. 2005-524998.
Figure 9:
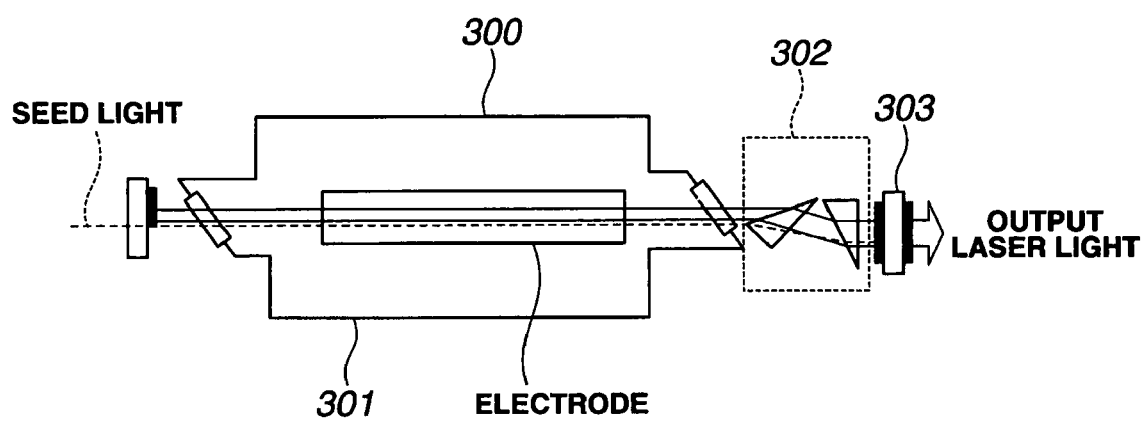
FIG. 9 is a diagram illustrating a conventional example (2) described in Japanese Unexamined Patent Application Laid-open No. 2006-049839.

FIG. 7 illustrates the configuration of a narrow-band laser device for exposure apparatus in a seventh embodiment of the present invention, showing an instance where the ring resonator comprises five mirrors, and the seed light is injected displaced parallelly within a plane perpendicular to a plane that includes the discharge direction.

The figure illustrates a top view of an amplification stage laser (PO) 20. The configuration and the like of an oscillation stage laser (MO) are omitted herein, being identical to that of FIG. 1. A laser beam emitted by an oscillation stage laser (MO) 10 functions as a seed laser beam, while the amplification stage laser (PO) 20 has a function of amplifying that seed laser light.

The differences vis-à-vis the sixth embodiment (FIG. 6) are explained next.

In the present embodiment, (1) the ring resonator comprises five mirrors, i.e. an OC 24 and high reflection mirrors 5a through 5d. (2) The optical path of round trip light traveling between the OC 24 and the high reflection mirror 5b is made to coincide with the longitudinal direction of the electrodes 2a, while the optical path of round trip light traveling between the high reflection mirror 5a and the high reflection mirror 5d is arranged tilted relative to the longitudinal direction of the electrodes 2a.

(3) Moreover, the light reflected at the high reflection mirror 5a is reflected at the high reflection mirror 5d, and from the high reflection mirror 5d it enters the high reflection mirror 5b via the high reflection mirror 5c.

On the output side of the laser chamber 21 of the amplification stage laser (PO) 20 there is arranged the OC 24, covered with a partially reflecting PR coat, and into/from which seed light enters and is partly reflected at an angle of 45 degrees, and the high reflection mirror 5a for high reflection at an incidence angle of 45 degrees, such that the surfaces of the OC 24 and the high reflection mirror 5a form an angle of about 90 degrees between them.

On the rear side of the chamber 21 there are arranged the high reflection mirrors 5c and 5d for high reflection, at an incidence angle slightly smaller than 22.5 degrees. The high reflection mirror 5b, having a 45-degree incidence angle, is also arranged on the rear side of the chamber 21.

That is, the mirror surfaces of the OC 24 and the high reflection mirrors 5a, 5b, 5c and 5d are set so as to be parallel to the discharge direction of the electrodes, so that the optical path of light in the ring resonator lies within a plane perpendicular to the discharge direction. In this example, seed light is injected parallel to a plane that is within a plane perpendicular to a plane of the discharge direction and that includes the discharge region between electrodes.

In FIG. 7, the high reflection mirror 4c causes seed light from the oscillation stage laser (MO) to enter, with an incidence angle of 45 degrees, an end portion A of the OC 24 of the amplification stage laser (PO) 20.

Part of the beam passes through the OC 24 and enters the high reflection mirror 5a at an angle slightly smaller than 45 degrees. The seed light traverses the window 22a and enters the laser chamber 21.

The seed light passes obliquely between the discharge electrodes 2a, so as to cross the longitudinal direction axis of the discharge electrodes 2a. Synchronizing with the seed light, voltage from a power source not shown in the figure is applied to cause discharge between the electrodes 2a.

Seed light is amplified thereby and traverses the chamber 21. The seed light is reflected, with high reflectance, by the high reflection mirrors 5d and 5c, at an incidence angle smaller than 22.5 degrees, and enters, at 45 degrees, on the high reflection mirror 5b.

The light enters again the laser chamber 21 via the window 22b, so as to pass through the discharge space of the discharge electrodes 2a, along an optical path parallel to the longitudinal direction axis of the discharge electrodes 2a of the ring resonator. The seed light is led into the discharge space of the electrodes 2a, is amplified, and reaches the OC 24.

The beam enters thus the end portion A and the end portion B, opposite to the end portion A with respect to a central optical axis (in this example, the axis denoted as a dotted line in the figure, and running centrally between the optical path of light injected into the resonator in an odd-numbered round trip and the optical path in an even-numbered round trip).

The light transmitted at the OC 24 is outputted as output laser light (amplified light through the discharge space in one round trip). The total reflection mirror 5a returns the light reflected at the OC 24 back to the laser chamber 21 once more, along an optical path mutually parallel to the optical path of the first round trip, is amplified, passes through the chamber 21, and is reflected with high reflectance by the total reflection mirrors 5d, 5c and 5b.

The beam returns again to the laser chamber 21, along an optical axis mutually parallel to the optical path of the first round trip, traverses the discharge space and is amplified.

This amplified light enters a position (end portion A) of the OC 24 that coincides with the injection position of the seed light, whereupon the transmitted light is outputted as laser light of a second round trip. The reflected light proceeds through the ring resonator, as light of a third round trip, and is amplified. The optical axis of the third round trip becomes the same optical path of the first round trip. In the ring resonator of the present embodiment, thus, the optical paths of odd-numbered round trips coincide, and the optical paths of even-numbered round trips coincide.

Arranging as the ring resonator a ring resonator having five mirrors, and injecting injection light to the five mirrors affords the following effects, in addition to the effects of the sixth embodiment illustrated in FIG. 6.

As the light in the ring resonator advances from the high reflection mirror 5a to the high reflection mirror 5d, it traverses the discharge space, crossing the discharge electrodes, and as the light advances next from the high reflection mirror 5b to the OC 24, it traverses the discharge space along the electrodes, becoming amplified thereby. Amplification efficiency becomes hence highly stable, as compared with the embodiment of FIG. 6.

In the above first through seventh embodiments, the high reflection film of the OC and the high reflection mirrors, and the antireflective film of the windows are coated for a P-polarized component.

The coating material used is $MgF_2$, as a low-refractive index material having little absorption at 193 nm, and $GdF_3$ or $LaF_3$ as high-refractive index materials. Vapor-deposition methods for these films include resistance heating, ion beam sputtering and magnetron sputtering. Films manufactured by sputtering in an $F_2$ gas atmosphere, having little scattering and absorption, are particularly suitable for coating the optical elements used in the ring resonator of a high-output amplification stage laser (PO).

What is claimed is:

1. A narrow-band laser device for exposure apparatus being an injection-locked discharge excited laser device comprising a narrow-band oscillation stage laser (MO) and an amplification stage laser (PO) arranged with a ring-type resonator including a plurality of optical elements, the ring-type resonator not expanding a laser beam, wherein the ring-type resonator comprises a first optical element and a second optical element opposing each other and disposed on opposite sides of discharge electrodes, each of the first optical element and the second optical element including two nonparallel mirror surfaces, the first optical element and the second optical element being arranged such that an MO laser light injected from the narrow band oscillation stage laser (MO) into the ring-type resonator makes a round trip within the ring-type resonator via optical paths which are parallel to an optical axis direction of the ring-type resonator, the plurality of the optical elements are arranged such that a first axis and a second axis are offset to each other with respect to a plane parallel to a discharge direction and parallel to the optical axis direction of the ring-type resonator, the first axis passing through an intersection line of two planes including the two mirror surfaces of the first optical element and being parallel to the optical axis direction of the ring-type resonator, the second axis passing through an intersection line of two planes including the two mirror surfaces of the second optical element and being parallel to the optical axis direction of the ring-type resonator, whereby a n+1th round trip optical path of the MO laser light injected into the ring-type resonator travels parallel and spaced with respect to a $n^{th}$ round trip optical path, within a plane perpendicular to the discharge direction.

2. A narrow-band laser device for exposure apparatus being an injection-locked discharge excited laser device comprising a narrow-band oscillation stage laser (MO) and an amplification stage laser (PO) arranged with a ring-type resonator including a plurality of optical elements, the ring-type resonator not expanding a laser beam, wherein the plurality of optical elements are arranged so that a $n+1^{th}$ round trip optical path of an MO laser light injected from the narrow band oscillation stage laser (MO) into the ring-type resonator travels parallel and spaced with respect to a $n^{th}$ round trip optical path within a plane perpendicular to a discharge direction, but upon being injected at a predetermined angle relative to the ring-type resonator, the MO laser light makes a round trip via the same optical path within the ring-type resonator, and the MO laser light is injected into the ring-type resonator at an angle different from the predetermined angle so that a $n+1^{th}$ round trip optical path of the MO laser light injected to the ring-type resonator travels via an optical path which is different from a $n^{th}$ round trip optical path in a direction substantially perpendicular to a plane of the discharge direction of the amplification stage laser (PO) and which is parallel to an optical axis direction of the ring-type resonator.

3. A narrow-band laser device for exposure apparatus being an injection-locked discharge excited laser device comprising a narrow-band oscillation stage laser (MO) and an amplification stage laser (PO) arranged with a ring-type resonator including a plurality of optical elements, the ring-type resonator not expanding a laser beam, wherein a mirror of the ring-type resonator is provided as an odd number of mirrors equal to or greater than three, including an output coupling mirror, and mirror arrangement in the ring-type resonator, and an injection position of the laser light in the ring-type resonator are selected so that a $n+1^{th}$ round trip optical path of an MO laser light injected from the narrow band oscillation stage laser (MO) into the ring-type resonator travels parallel and spaced with respect to a $n^{th}$ round trip optical path, within a plane perpendicular to a discharge direction, and that an optical path of the MO laser light injected into the ring-type resonator in even-numbered round trips is different from an optical path in odd-numbered round trips and a $n^{th}$ round trip optical path is the same with a $n+2^{th}$ round trip optical path.

4. A narrow-band laser device for exposure apparatus being an injection-locked discharge excited laser device comprising a narrow-band oscillation stage laser (MO) and an amplification stage laser (PO) arranged with a ring-type resonator including a plurality of optical elements, the ring-type resonator not expanding a laser beam, wherein the ring-type resonator comprises a first optical element and a second optical element opposing each other and disposed on opposite sides of discharge electrodes, each of the first optical element and the second optical element including two nonparallel mirror surfaces, the first optical element and the second optical element being arranged such that an MO laser light injected from the narrow band oscillation stage laser (MO) into the ring-type resonator makes a round trip within the ring-type resonator via optical paths which are parallel to an optical axis direction of the ring-type resonator, the plurality of the optical elements are arranged such that a first axis and a second axis are offset to each other with respect to a plane parallel to a discharge direction and parallel to the optical axis direction of the ring-type resonator, the first axis passing through an intersection line of two planes including the two mirror surfaces of the first optical element and being parallel to the optical axis direction of the ring-type resonator, the second axis passing through an intersection line of two planes including the two mirror surfaces of the second optical element and being parallel to the optical axis direction of the ring-type resonator, whereby the MO laser light injected into the ring-type resonator makes a plurality of round trips in a plurality of different parallel optical paths.

5. A narrow-band laser device for exposure apparatus being an injection-locked discharge excited laser device comprising a narrow-band oscillation stage laser (MO) and an amplification stage laser (PO) arranged with a ring-type resonator including a plurality of optical elements, the ring-type resonator not expanding a laser beam, wherein the ring-type resonator comprises a first optical element and a second optical element opposing each other and disposed on opposite sides of discharge electrodes, each of the first optical element and the second optical element including two nonparallel mirror surfaces, the first optical element and the second optical element are each arranged so that a first axis and a second axis are within a same plane perpendicular to a plane of a discharge direction of the amplification stage laser (PO), the first axis passing through an intersection line of two planes including the two mirror surfaces of the first optical element and being parallel to the optical axis direction of the ring-type resonator, the second axis passing through an intersection line of two planes including the two mirror surfaces of the second optical element and being parallel to the optical axis direction of the ring-type resonator, and the first optical and the second optical elements are arranged so that an MO laser light injected from the narrow band oscillation stage laser (MO) into the ring-type resonator makes a round trip within the ring-type resonator via round trip optical paths which are different from each other, and that a $n+1^{th}$ round trip optical path of the MO laser light travels parallel and spaced with respect to a $n^{th}$ round trip optical path within a plane perpendicular to the discharge direction, the $n+1^{th}$ round trip optical path being different from the $n^{th}$ round trip optical path in a direction substantially perpendicular to the plane of the discharge direction.

* * * * *